United States Patent
Sugawara et al.

(10) Patent No.: US 9,342,615 B2
(45) Date of Patent: May 17, 2016

(54) REDUCING REDIRECTS

(75) Inventors: Yu Sugawara, Tokyo (JP); Yoshikiyo Kato, Tokyo (JP); Ryoichi Imaizumi, Tokyo (JP); Ken'ichi Fukushima, Tokyo (JP)

(73) Assignee: Google Inc., Mountain View, CA (US)

( * ) Notice: Subject to any disclaimer, the term of this patent is extended or adjusted under 35 U.S.C. 154(b) by 127 days.

(21) Appl. No.: 13/534,640

(22) Filed: Jun. 27, 2012

(65) Prior Publication Data
US 2013/0151552 A1 Jun. 13, 2013

Related U.S. Application Data

(60) Provisional application No. 61/567,758, filed on Dec. 7, 2011.

(51) Int. Cl.
*G06F 17/30* (2006.01)

(52) U.S. Cl.
CPC ...... *G06F 17/30899* (2013.01); *G06F 17/3089* (2013.01); *G06F 17/30882* (2013.01); *G06F 17/30994* (2013.01)

(58) Field of Classification Search
CPC ............. G06F 17/30761; G06F 17/30; G06F 17/30696; G06F 17/30864; G06F 17/30887; G06F 17/30386; G06F 17/30905; G06F 17/30867; G06F 17/30241; G06F 17/30424; G06F 17/30979; G06F 17/30991
USPC .................................................. 707/705–782
See application file for complete search history.

(56) References Cited

U.S. PATENT DOCUMENTS

| | | | |
|---|---|---|---|
| 7,809,697 B1 | 10/2010 | Kanefsky et al. | |
| 2006/0173829 A1* | 8/2006 | Neeman | 707/3 |
| 2007/0027857 A1* | 2/2007 | Deng | G06F 17/30905 |
| 2007/0220419 A1* | 9/2007 | Stibel et al. | 715/511 |
| 2008/0021874 A1* | 1/2008 | Dahl et al. | 707/3 |
| 2008/0183699 A1* | 7/2008 | Hu et al. | 707/5 |
| 2008/0320498 A1 | 12/2008 | Maykov et al. | |
| 2009/0006338 A1* | 1/2009 | Ives et al. | 707/3 |
| 2012/0016655 A1* | 1/2012 | Travieso | G06F 17/2827 704/2 |
| 2012/0054192 A1* | 3/2012 | Song | G06F 17/30887 707/741 |
| 2012/0185835 A1* | 7/2012 | Klots et al. | 717/152 |
| 2012/0254402 A1* | 10/2012 | Panidepu et al. | 709/224 |
| 2012/0311017 A1 | 12/2012 | Sze et al. | |

OTHER PUBLICATIONS

Notification of the International Search Report and the Written Opinion of the International Searching Authority for PCT/US2012/067290, mailing date Apr. 3, 2013, 10 pages.

(Continued)

*Primary Examiner* — Michelle Owyang
(74) *Attorney, Agent, or Firm* — Fish & Richardson P.C.

(57) ABSTRACT

Methods, systems, and apparatus, including computer programs encoded on a computer storage medium, for modifying search results. In one aspect, a method includes receiving data that specify a set of responsive resources for a search request that was submitted by a user device. A determination is made that a resource request for a particular resource from the set of responsive resources will cause the user device to be redirected to a different resource than the particular resource. In response to the determination a reference to the different resource is inserted into a search result for the particular resource. The search result for the particular resource is provided to the user device, where the search result includes the reference to the different resource.

23 Claims, 4 Drawing Sheets

(56) References Cited

OTHER PUBLICATIONS

Anonymous: "Google Search Engine Optimization Starter Guide" Jan. 1, 2010, XP55054020, Retrieved from Internet: URL: http://statistic.googleusercontent.com/external_content/untrusted_dlcp/www.google.com/de//webmasters/doc/search-engine-optimization-starter-guide.pdf [retrieved on Feb. 20, 2013] p. 26, section "Redirect mobile users to the correct version", 32 pages.

* cited by examiner

REDUCING REDIRECTS

CROSS-REFERENCE TO RELATED APPLICATIONS

This application claims the benefit under 35 U.S.C. §119(e) of U.S. Patent Application No. 61/567,758, entitled "REDUCING REDIRECTS," filed Dec. 7, 2011, which is incorporated herein by reference in its entirety.

BACKGROUND

This specification relates to data processing and information retrieval.

The Internet provides access to a wide variety of resources such as images, video or audio files, and web pages for particular subjects, book articles, or news articles. A search system can identify resources that are responsive to a search query and provide search results that reference the identified resources. Users can view the search results on a display device and request presentation of the resources through interaction with the search results. For example, in response to user interaction with a search result, the resource that is referenced by the search result can be presented in the display in which the search result was presented.

SUMMARY

In general, one innovative aspect of the subject matter described in this specification can be embodied in methods that include the actions of receiving data that specify a set of responsive resources for a search request that was submitted by a user device; determining, by a data processing apparatus, that a resource request for a particular resource from the set of responsive resources will cause the user device to be redirected to a different resource than the particular resource; in response to the determination, inserting, by a data processing apparatus, a reference to the different resource into a search result for the particular resource, the reference being configured to initiate a resource request for the different resource in response to user interaction with the search result, the resource request being initiated independent of a resource request for the particular resource; and providing the search result for the particular resource to the user device, the search result including the reference to the different resource. Other embodiments of this aspect include corresponding systems, apparatus, and computer programs, configured to perform the actions of the methods, encoded on computer storage devices.

These and other embodiments can each optionally include one or more of the following features. Determining that a request for the particular resource will cause the user device to be redirected to a different resource can include determining that the user device is a mobile device; and determining that a resource request for the particular resource from a mobile device will cause the mobile device to be redirected.

Determining that a resource request for the particular resource from a mobile device will cause the mobile device to be redirected can include receiving redirect data specifying one or more resources that have been identified as a redirect resource, a redirect resource being a resource that will cause at least one user device to request a different resource in response to a resource request for the redirect resource; determining that an identifier for the particular resource is included in the redirect data; and determining that the redirect data for the particular resource indicate that the particular resource causes mobile devices to be redirected to the different resource in response to a request for the particular resource from the mobile devices.

Methods can further include the action of determining that the redirect data for the particular resource indicate that the particular resource does not cause non-mobile devices to be redirected to the different resource in response to a resource request for the particular resource from the non-mobile devices.

Methods can further include the actions of receiving data that specify a search result for the particular resource, the search result including a link to the particular resource; determining that the search result is being provided to a non-mobile device; and providing the search result to the non-mobile device, the search result including the link to the particular resource.

Methods can further include the actions of receiving, by the user device, the search result for the particular resource, the search result including the reference to the different resource; determining, by the user device, that a user interaction with the search result occurred; and requesting, by the user device, the different resource in response to the user interaction with the search result.

Methods can further include the actions of determining that language setting data received from the user device specifies a particular language for the user device. Determining that the request for the particular resource will cause the user device to be redirected to a different resource can include determining that the different resource is selected based, at least in part, on receiving, from the user device, the language setting data representing the particular language.

Methods can further include the actions of determining, by a data processing apparatus, that the set of responsive resources includes a brand-based redirect resource, the brand-based redirect resource being a resource that causes a particular brand of user device to be redirected to a brand-specific resource that is different than the brand-based redirect resource; determining that brand-based redirect data for the brand-based redirect resource is not available for at least one brand of user device; and providing a search result for the brand-based redirect resource to the user device, the search result for the brand-based redirect resource including a reference to the brand-based redirect resource.

Methods can further include the actions of determining, by a data processing apparatus, that the set of responsive resources includes a language-based redirect resource, the language-based redirect resource being a resource that causes a user device having particular language setting data to be redirected to a language-specific resource that is different than the language-based redirect resource; determining that language-based redirect data for the language-based redirect resource is not available for at least one language setting; and providing a search result for the language-based redirect resource to the user device, the search result for the language-based redirect resource including a reference to the language-based redirect resource.

Methods can further include the actions of determining, by a data processing apparatus, that the set of responsive resources includes a transient redirect resource, the transient redirect resource being a resource that causes a user device to be redirected to a transient resource that is different than the transient redirect resource; and providing a search result for the transient redirect resource to the user device, the search result for the transient redirect resource not including a reference to the transient resource.

Particular embodiments of the subject matter described in this specification can be implemented so as to realize one or more of the following advantages. Mobile search results (i.e., search results that are provided to a mobile computing device) can link to a resource that has been identified as a mobile resource rather than linking to a desktop resource (i.e., a resource that has not been identified as a mobile resource). Linking a mobile search result to a mobile resource can prevent the mobile computing device from requesting the desktop resource prior to being redirected to the mobile resource. Reducing the number of redirects between user selection of a mobile search result and presentation of the mobile resource can reduce the amount of time required to present the mobile resource.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Search results that are provided in response to a search query specify resources that have been identified as responsive to the search query (e.g., resources having at least a threshold relevance score for the search query). Each of the search results generally includes a link (e.g., an active hypertext link) to one of the resources that has been identified as responsive to the search query, and user interaction with a search result will initiate a request for the resource to which the search result is linked. For example, a search result for an electronics retailer may include a hypertext link that initiates a request for a home page of the retailer's web site in response to user interaction with the search result.

In some situations, a request for a particular resource may cause the user device to be redirected to another resource (i.e., a resource different than the requested resource). For example, some publishers create mobile resources that have been formatted for viewing on a mobile device, such as a mobile phone, and redirect a mobile device to the mobile resource in response to a request from the mobile device for the particular resource. A mobile resource is a resource that has been determined to have been formatted for presentation on mobile devices, and data identifying the resource as a mobile resource can be stored with a reference to the resource to identify it as such. A mobile resource can include a resource to which mobile devices are redirected in response to a request for another resource, when non-mobile devices (i.e., devices that have not been identified as mobile devices) are not redirected following a request for the other resource.

When it is determined that a request for a particular resources causes a mobile device to be redirected to another resource, the search result for the particular resource can include a link (or another reference) to the other resource to which the mobile device would otherwise be redirected. For example, the link to the other resource can be inserted into the search result so that the mobile device requests the other resource, rather than the particular resource, in response to user interaction with the search result.

Figure 1:
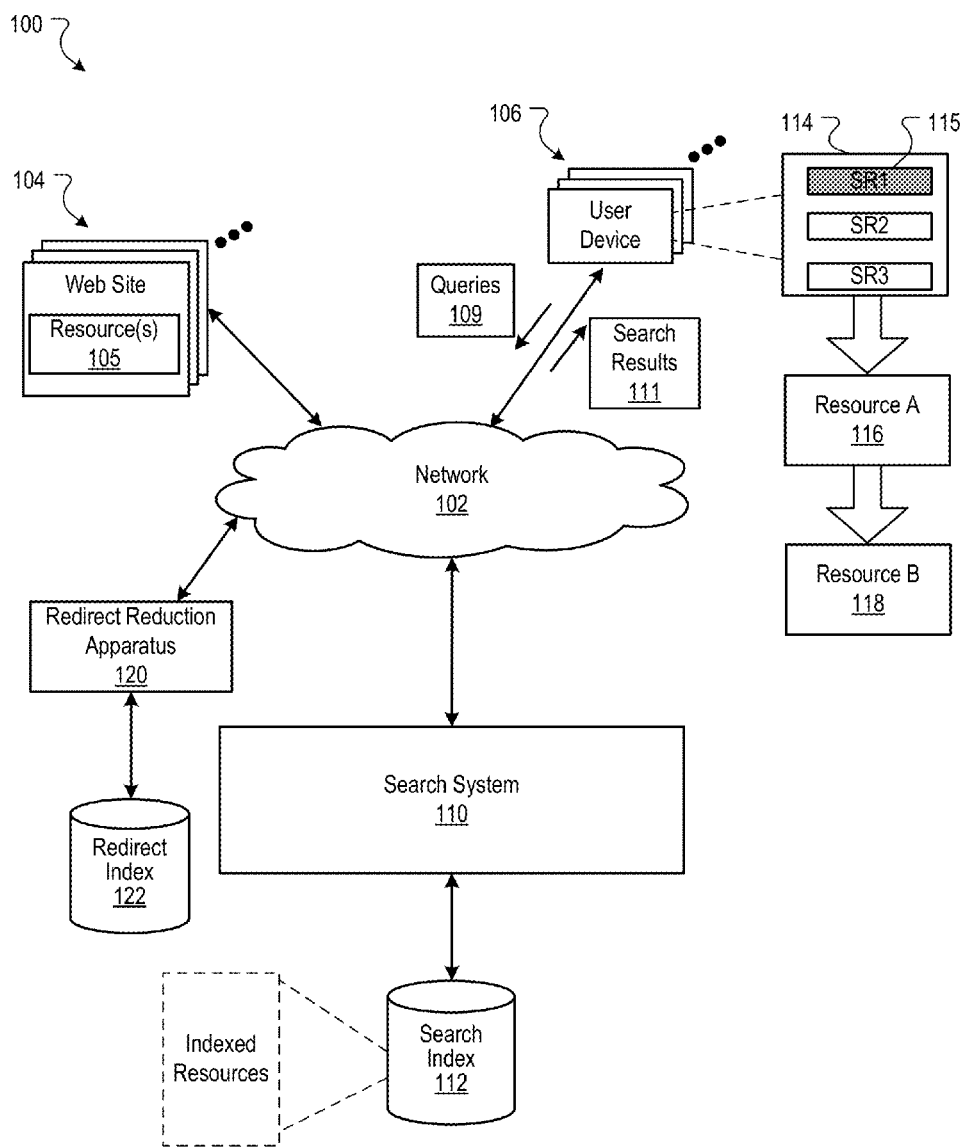
FIG. 1 is a block diagram of an example environment in which a search system provides search services.

FIG. 1 is a block diagram of an example environment 100 in which a search system 110 provides search services. The example environment 100 includes a network 102, e.g., a local area network (LAN), wide area network (WAN), the Internet, or a combination of them, connects web sites 104, user devices 106, and the search system 110. The network 102 can be accessed over a wired and/or a wireless communications link. For example, mobile computing devices, such as smartphones can utilize a cellular network to access the network. The environment 100 may include millions of web sites 104 and user devices 106.

A web site 104 is one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is data provided over the network 102 (e.g., by a web site 104) and that is associated with a resource address. Resources 105 include HTML pages, word processing documents, and portable document format (PDF) documents, images, video, and feed sources, to name just a few. The resources 105 can include content, e.g., words, phrases, images and sounds and may include embedded information (e.g., meta information and hyperlinks) and/or embedded instructions (e.g., scripts).

A user device 106 is an electronic device that is under control of a user and is capable of requesting and receiving resources 105 over the network 102. Example user devices 106 include personal computers, mobile computing devices (e.g., smartphones and/or tablet computing devices) that can send and receive data over the network 102. As used throughout this document the term mobile computing device ("mobile device") refers to a user device that is configured to communicate over a mobile communications network. A smartphone (i.e., a phone that is enabled to communicate over the Internet) is an example of a mobile device.

A user device 106 typically includes a user application, e.g., a web browser, to facilitate the sending and receiving of data over the network 102. Mobile devices may utilize a "mobile browser" to send and receive data over the network 102. As used throughout this document, a mobile browser is a browser that is identifiable as a browser that is installed on mobile devices. A mobile browser can be identified as such, for example, based on a version number or another identifier indicating that the browser is a mobile version of a browser. For example, a browser developer may create a mobile browser specifically for use on mobile devices and assign that mobile browser a version number with which the mobile browser can be identified as such. As described in more detail below, the version number of the browser and/or other information about the browser may be included in a user-agent header that is included in communications from the user device.

To facilitate searching of resources 105, the search system 110 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 112.

The user devices 106 submit search queries 109 to the search system 110. In response, the search system 110 accesses the search index 112 to identify resources 105 that are relevant to (e.g., have at least a minimum specified relevance score for) the search query 109. The search system 110 identifies the resources 105, generates search results 111 that identify the resources 105, and returns the search results 111 to the user devices 106.

A search result 111 is data generated by the search system 110 that identifies a resource 105 that is responsive to a particular search query, and can include a link to the resource 105. An example search result 111 can include a web page title, a snippet of text or a portion of an image extracted from the web page, and the URL of the web page.

The search results 111 (e.g., SR1, SR2, SR3) are presented in a search results page 114 that is displayed at the user device. User interaction a search result (e.g., SR1 115) causes the user device 106 to request a resource (e.g., Resource A 116) that is referenced by the search result. In some implementations, the user device 106 submits a hypertext transfer protocol ("http") request for a resource that is located at a uniform resource locator ("URL") specified by the search result with which the user interaction occurred. For example, user interaction with the search result SR1 115 can cause the user device 106 request Resource A 116 that is referenced by the search result SR1 115. In response to the request, data that cause presentation of Resource A 116 may be received by the user device 106 and used to present Resource A 116 at the user device 106.

In response to some resource requests, a redirect instruction (e.g., data directing the user device to request data from another network location) is returned to the user device instead of (or in addition to) the data that cause presentation of the resource. For example, when a request for Resource A 116 is received from a user device, a redirect instruction may be provided to the user device 106 instructing the user device to request presentation of Resource B 118. The redirect instruction can include a URL (or another network location) from which the user device 106 is to request data.

Redirect instructions may be provided to user devices for a variety of reasons. For example, a redirect instruction may be provided to a user device 106 when data is unavailable from the network location from which the user device 106 requested the data. Redirects may also be provided to a particular type of user device in an effort to direct that particular type of user device to a resource that has been created for viewing on the particular device.

For example, some publishers create multiple versions of a particular web page (or another resource), where one version of the web page is formatted for viewing on a mobile device, while another version of the web page is formatted for viewing on a non-mobile device (i.e., a device that has not been identified as a mobile device). In this example, the version of the web page that is formatted for viewing on a mobile device may use fewer graphics or lower resolution graphics, less multi-media content, and/or a different aspect ratio than the version of the web page that is formatted for viewing on a non-mobile device. As noted above, resources that have been formatted for viewing on a mobile device are referred to as mobile resources, while resources that have been formatted for viewing on a non-mobile device are referred to as desktop resources (e.g., a desktop web page) even though these resources may be presented on any computing device.

When a publisher has created multiple versions of a web page (or another resource), a mobile device that requests a desktop web page may be automatically redirected to the mobile web page that corresponds to the desktop web page. For example, assume that Resource A 116 is a desktop web page to which the search result SR1 115 links, and that the user device 106 is a mobile device that has requested Resource A 116. In this example, the mobile device may be automatically redirected to request Resource B 118 so that a mobile resource, rather than a desktop resource, is presented at the mobile device.

Some redirects are initiated based solely (or only in part) on whether the user device from which a request for a resource was received has been identified as a mobile device, or a non-mobile device, and example techniques for determining whether a user device is a mobile device or a desktop device are described below. However, some redirects may be based on data, such as a cookie, that is stored on the user device. For example, if a search provider also offers other online services, such as an online e-mail account, an online shopping cart, or other online services (e.g., a social network, blog hosting, an image sharing service, and/or a video sharing service), the online search provider may place one or more cookies on a user's device to enhance the user's experience (e.g., by storing user preferences or account information to facilitate user-customized experiences).

A cookie is a data file that uniquely identifies a user device (e.g., using a pseudo-random number or a data hash that anonymously identifies the user device). A cookie that is placed on a user device is generally only accessible by the entity that placed the cookie on the user device. For example, if a provider of search services (e.g., example.com) places a cookie on a particular user device, the provider of the search services (e.g., example.com servers) will generally be the only entity that is able to access to the cookie.

Cookies can be used to identify users that have previously visited a particular web site (i.e., assuming that the user has agreed to have cookies stored on their device). For example, users of web-based mail services may have a cookie stored on their user device when they log-in to their e-mail account (e.g., by entering a user name and password). For a specified period of time following access to the e-mail account, the user may be able to return to directly to their e-mail account without again manually entering a user name and/or password.

For example, assume that after navigating away from the web-based e-mail service (e.g., navigating to an online newspaper or a search interface) the user device requests a log-in page for the web-based e-mail service. In this example, upon detection of the cookie that is stored on the user device (and a determination that the specified period has not passed), the user device may be redirected to a web page presenting the user's e-mail account without requiring the user to re-enter their user name or password. Web-based e-mail services have been used for purposes of example, but other online services that utilize cookies, such as an online retailer, can also initiate redirects in response to detecting the cookie.

Resources can also redirect user devices based on a brand (e.g., a manufacturer) of the user device. For example, a mobile phone application developer may create a web page that user devices can request to purchase and/or download an application that has been created by the developer. For purposes of illustration, assume that the application developer created a different version of the application for two or more different brands of phones (e.g., Brand A and Brand B) that each use different operating systems (or different versions of the same operating system). In this example, the application for each of the respective versions of the application may be available from a different network location (e.g., a web page for an application marketplace). Therefore, to redirect Brand A user devices to another web page from which the version of the application that was created for Brand A user devices can be purchased and/or downloaded (e.g., an application marketplace for Brand A phones). Similarly, the web page can be configured to redirect Brand B user devices to a web page from which the version of the application that was created for Brand B user devices can be purchased (e.g., an application marketplace for Brand B phones).

Each redirect that a user device is instructed to make results in a request for a resource that is stored at a different network location. For example, when a user device is redirected to a particular resource in response to requesting another resource, the user device will have made two resource requests prior to receiving the data that cause presentation of the particular resource. As the number of redirects that a user device makes increases, the latency between the initial resource request and presentation of a resource increases. Therefore, the latency between a resource request and presentation of a resource can be reduced by reducing the number of redirects that a user device is required to make prior to presentation of a resource.

The environment 100 includes a redirect reduction apparatus 120 that reduces the number of redirects that are performed by user devices. The redirect reduction apparatus 120 is a data processing apparatus that uses redirect data to determine whether a resource that is referenced by a search result is a redirect resource (i.e., a particular resource that redirects a user device that requests the particular resource to a different resource). The redirect reduction apparatus 120 is represented as being an independent apparatus that communicates with the search system 110 over the network 102, but in some implementations, the redirect reduction apparatus 120 could be implemented as part of the search system 120 or part of another system.

When the redirect reduction apparatus 120 determines, based at least in part on the redirect data, that a redirect resource is referenced by (e.g., linked to) a particular search result, the redirect reduction apparatus 120 can insert, into the particular search result, a reference (e.g., a hypertext link) to the different resource to which redirect resource redirects user devices. Therefore, user interaction with the particular search result will initiate a request for the different resource, rather than a request for the redirect resource. Accordingly, the user device can request the different resource without first requesting the redirect resource.

The redirect data can be obtained, for example, from a redirect data store 122. The redirect data store 122 is a data store that stores redirect data specifying a set of redirect resources and, for each redirect resource in the set, different resources to which the redirect resource redirects user devices. For example, if user devices that request Resource A 116 are redirected to Resource B 118, the redirect data store 122 will include redirect data specifying the redirect from Resource A 116 to Resource B 118.

In some implementations, the redirect data can specify whether all, or only proper subsets, of user devices that request a particular redirect resource are redirected in response to the request. For example, if only devices that have been identified as mobile devices are redirected to Resource B 118 in response to a request for Resource A 116, the redirect data for Resource A may specify that the redirect is conditioned on the request for Resource A 116 being received from a mobile device.

The redirect data can further specify whether the redirect is conditioned on other factors, such as detection of a cookie on the user device from which the resource was requested. For example, if the redirect from Resource A 116 to Resource B 118 only occurs when a particular cookie is determined to be stored on the user device, the redirect data for Resource A can specify that the redirect to Resource B 118 is conditioned on the presence of the particular cookie (e.g., a cookie that was previously placed on the user device by the publisher of Resource A). The redirect data can also specify any other redirect conditions that must be satisfied for a particular redirect to occur.

In some implementations, the redirect data can also specify whether language setting data from the user device is used by a resource to conditionally redirect user devices. The language setting data may be received from the user device with a search request and/or a request for a resource. The language setting data are data that indicate a language in which information is presented at the user device. For example, a language setting of "en" may indicate that information presented on the user device is presented in English, while a language setting of "de" may indicate that the information is presented in German. Some publishers may create different versions of a particular page, for example, to provide a region-specific version of the page, or a language specific version of the page. Therefore, when the publisher receives a request for a particular home page (e.g., example.com), the publisher may redirect the user device to a language specific web page (e.g., example.com/german).

Figure 2A:
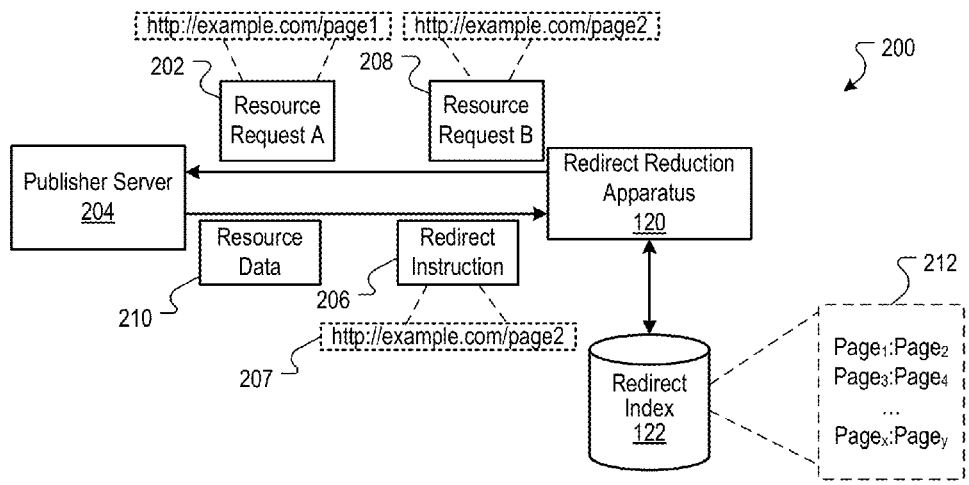
FIG. 2A is a block diagram of an example data flow for identifying redirect resources.

FIG. 2A is a block diagram of an example data flow 200 for identifying redirect resources. The data flow begins with the redirect reduction apparatus 120 initiating Resource Request A 202 that requests a resource from a publisher server 204. Resource Request A can be, for example, an http request for a resource located at the network location example.com/page1. If the resource that is located at example.com/page1 is a redirect resource, then publisher server 204 will respond to Resource Request A 202 with redirect instructions 206 that includes a network location 207 from which the redirect reduction apparatus 120 is to request another resource. For example, in response to receiving a request for the resource located at example.com/page1, the publisher server 204 may provide the redirect instructions 206 that instruct the redirect apparatus 120 to request data from example.com/page2, rather than providing data that cause presentation of a resource.

When the redirect reduction apparatus 120 receives the redirect instructions 206, the redirect reduction apparatus 120 initiates another resource request. For example, the redirect reduction apparatus 120 can initiate Resource Request B 208 that requests the resource located at example.com/page2. If the resource located at example.com/page2 is not a redirect resource, the publisher server 204 may respond to the request by providing resource data 210 that cause presentation of the resource that is located at example.com/page2. However, if the resource located at example.com/page2 is another redirect resource, the publisher server 204 will again provide redirect instructions that redirect the redirect reduction apparatus 120 to another network location, and the request process can iteratively continue until a resource is presented and/or a timeout (e.g., a maximum number of redirects or a maximum elapsed time following the initial resource request) occurs.

In response to receiving the resource data 210, the redirect reduction apparatus 120 can confirm that the resource data 210 does not include redirect instructions, and therefore, determine that the resource that was provided in response to Resource Request B 208 is a standard resource (i.e., a resource that does not redirect the user device in response to the resource request) rather than a redirect resource. In turn, the redirect reduction apparatus 120 can store redirect data 212 in the redirect index 122. In this example, the redirect data 212 that are stored can indicate that a request for example- .com/page1 (e.g., "Page$_1$") will redirect a user device to example.com/page2 (e.g., "Page$_2$"), as represented by the notation "Page$_1$:Page$_2$" in FIG. 2A. The redirect data can also specify other redirect resources (e.g., Page$_3$ and Page$_x$) that redirect user devices to other standard resources (e.g., Page$_4$ and Page$_y$, respectively). Note that if multiple redirects occur between a first requested resource (e.g., Page$_x$) and presentation of a resource that is not a redirect resource, data indicating each intervening redirect resource (or a proper subset thereof) can be stored in the redirect index. Alternatively, or additionally, resource data 212 specifying only the initially requested redirect resource and the standard resource that was presented following the last redirect can be stored.

In some implementations, multiple redirect reduction apparatus 120 are used to request the same resource. In these implementations, each redirect reduction apparatus 120 can emulate a different type of user device, such that different redirect behaviors for different resources can be detected, and a particular resource can be identified as a redirect resource or a standard resource on a per-device basis.

For example, one redirect reduction apparatus 120 can emulate a smartphone, while another redirect reduction apparatus can emulate a desktop device. In this example, the redirect data 212 that are obtained using each of the redirect reduction apparatus can be compared to determine whether a resource conditions redirects based on the type of user device that has requested the resource. For example, if a particular resource redirects mobile devices, but does not redirect desktop devices, this conditional redirect behavior can be detected using both a redirect reduction apparatus 120 that emulates a desktop device and a redirection reduction apparatus 120 that emulates a mobile device.

A redirect reduction apparatus 120 can emulate a particular type of user device, for example, using a user-agent header (or other device identification data) that specifies the type of device from which a resource request was initiated and/or other details about the device that initiated the resource request. For example, as described in more detail with reference to FIG. 3, the agent-header can specify information that enables a publisher server 204 to determine whether a user device that requests a resource is a mobile device or a desktop device, and/or a manufacturer of the device. Thus, depending on the user-agent header (or other device identification data) used by the redirect reduction apparatus, the redirect reduction apparatus 120 (or another data processing apparatus) that requests a resource may be considered a mobile device or a desktop device by a publisher server 204, such that the redirect reduction apparatus 120 can obtain redirect data for different types of user devices. Redirect data for each type of device can be stored in the redirect index to create a redirect profile for each redirect resource.

In some implementations, the redirect reduction apparatus 120 is configured to emulate one particular brand (or model) of mobile device, such that redirect data is collected for that particular brand (or model). Similarly, the redirect reduction apparatus 120 may be configured to present information is a single language (e.g., English), such that the language setting data for the redirect reduction apparatus 120 is static over time. For example, instead of initiating multiple requests for a particular resource using different user-agent headers, the redirect reduction apparatus 120 may use the same user-agent header for each resource request in order to reduce the processing resources required to obtain redirect data for many different resources.

When the redirect reduction apparatus 120 emulates only a proper subset of all user device configurations, it is possible that the redirect data for a particular redirect resource may not explicitly specify whether different types of user devices are redirected to different resources, or whether redirects are conditioned on language setting data for the user device. For example, although the redirect data may specify that Brand A user devices are redirected to another resource in response to a request for the particular resource (e.g., assuming that the redirect reduction apparatus 120 is configured to emulate a Brand A user device), the redirect data may not specify whether Brand B user devices are redirected (e.g., because the reduction apparatus 120 may not have requested the particular resource while emulating a Brand B device). Similarly, the redirect data may specify whether user devices using a particular language setting are redirected, while not specifying whether user devices using other language settings are also redirected.

In some implementations, the redirect reduction apparatus 120 can be configured to determine whether a search result for a particular resource should continue to link to the particular resource (e.g., rather than another resource) even though the particular resource has been identified as a redirect resource. In some implementations, the determination can be based, at least in part, on the redirect data for the resource and an analysis of a redirect chain for the particular resource. The redirect chain specifies two or more resources that are requested by a user device when a user device requests the particular resource. For example, if a user device requests Resource X and is then redirected to Resource Y, the redirect chain in this example may include the URL for Resource X and the URL for Resource Y (e.g., http//:example.com/>http://example.com/BrandA_Store).

In some implementations, the redirect reduction apparatus 120 can determine that a search result for a particular redirect resource will include a link to the particular redirect resource when the redirect resource is determined to be a "brand-based" redirect resource and only partial brand-based redirect data are available. Continuing with the example above, assume that the redirect reduction apparatus 120 that collected the redirect data was configured to emulate only a Brand A user device and not a Brand B device, and further assume that the Resource Y was a web page for an application store from which users of Brand A user devices can download applications that have been created for Brand A devices. In this example, the redirect data for the particular resource will specify that Brand A devices that request Resource X are redirected to Resource Y, but will not specify whether (or to what resource) Brand B devices are redirected, such that the redirect reduction apparatus 120 can determine that only partial brand-based redirect data are available.

In these implementations, when only partial brand-based redirect data are available, the redirect reduction apparatus 120 can inspect the URLs and/or content of the redirect resource and/or the different resource to which the redirect resource redirects user devices to determine whether the different resource to which the user devices are redirected is brand-specific resource. For example, if the URL of the different resource includes a reference to the particular brand, e.g., Brand A, and the redirect reduction apparatus 120 was emulating a Brand A device (i.e., a device of the same particular brand), then the different resource can be determined to be a brand-specific resource. Similarly, if the content of the redirect resource includes links to brand specific sites, e.g., links to sites that sell applications for Brand A phones, then the redirect initiated by the redirect resource can be considered a brand-based redirect. In turn, the redirect reduction apparatus 120 can determine that search results for the redirect resource will continue to include a link to the redirect resource (i.e., rather than being modified to include a link to the different resource) since the redirect was determined to be a brand-based redirect and brand-based redirect data was not available for at least one brand of user device, e.g., Brand B user devices. Data representing the outcome of this determination (e.g., brand-based data) can be stored, for example, in the redirect index 122.

The redirect reduction apparatus 120 can be configured to make a similar determination with respect to language-based redirect resources. In some implementations, the redirect reduction apparatus 120 will not modify a search result for a language-based redirect resource when the redirect is determined to be a language-based redirect and only partial language-based redirect data are available (i.e., redirect data are not available for at least one language setting). For example, assume that the redirect reduction apparatus 120 uses static language setting data, such that language-based redirect data are only available for a single language. In this example, the redirect data for a redirect resource will specify whether user devices having the same language setting data as the redirect reduction apparatus 120 will be redirected, but will not specify whether other user devices having other language setting data will also be redirected, or to where those other user devices would be redirected. Therefore, in this example, the redirect reduction apparatus 120 can determine that only partial language-based redirect data are available.

In some implementations, the redirect reduction apparatus 120 can examine the URL and/or content language for the redirect resources when only partial language-based redirect data are available. For example, the redirect reduction apparatus can examine the URL example.com/page3/en to which the page example.com/page2 redirects and determine that the URL includes the characters "en" which correspond to the language setting data for the English language. Similarly, the redirect reduction apparatus may examine the text of example.com/page2 and the text of example.com/en to determine whether the language of each of the resources is different. If the languages of two pages are determined to be different or the URL for the resource to which a user device is redirected includes a reference to the language setting data for the user device, the redirect reduction apparatus 120 can consider the redirect a language-based redirect. In turn, the redirect reduction apparatus 120 can determine that search results for the redirect resource will continue to include a link to the redirect resource (i.e., rather than being modified to include a link to the different resource) since the redirect was determined to be a language-based redirect and only partial language-based redirect data were determined to be available. Data specifying the outcome of this determination (e.g., language-based data) can be stored, for example, in the redirect index 122.

In some implementations, the redirect reduction apparatus 120 is configured to determine that a redirect chain for a particular redirect resource includes a transient link, such that the particular redirect resource is considered a transient redirect resource. In these implementations, the redirect reduction apparatus 120 can prevent the transient resource from being referenced by a search result for the transient redirect resource and determine which resource should be referenced by a search result for the transient redirect resource. For example, assume that the particular redirect resource includes the following redirect chain: http://example.com>http://example.com/m>http://example.com/2011/1/1?id=xxxyyzzz. In this example, the redirect reduction apparatus 120 may determine that the URL http://example.com/2011/1/1?id=xxxyyyzzz has a structure that is similar to URLs for other known transient resources (e.g., resources that are relocated or removed after a specified period), and therefore determine that the search result for example.com should not include a link to the transient resource. Therefore, the redirect reduction apparatus 120 can either not modify the search result for example.com or insert a link to the resource that is located at example.com/m.

The redirect reduction apparatus 120 can also identify transient resources, for example, by comparing over time the redirect chain for a particular redirect resource. For example, assume that example.com was first determined to have the following redirect chain: http://example.com 22 http://example.com/m>http//example.com/2011/1/1?id=xxxyyyzzz, and on a next request for example.com was determined to have the following redirect chain: http://example.com>http://example.com/m>http//example.com/2011/1/5?id=yyyxxxzzz. In this example, the last link in each instance of the redirect chain (e.g., example.com/2011/1/1?id=xxxyyyzzz and example.com//2011/1/5?id=yyyxxxzzz) can be determined to be transient resources, such that the redirect reduction apparatus 120 may not insert a link to these resources into a search result for example.com. In some implementations, a redirect chain can be required to have at least a minimum specified rate of change in order to classify a resource in the chain as a transient resource. Data specifying the outcome of this determination (e.g., transient resource data) can be stored for example, in the redirect index 122.

Figure 2B:
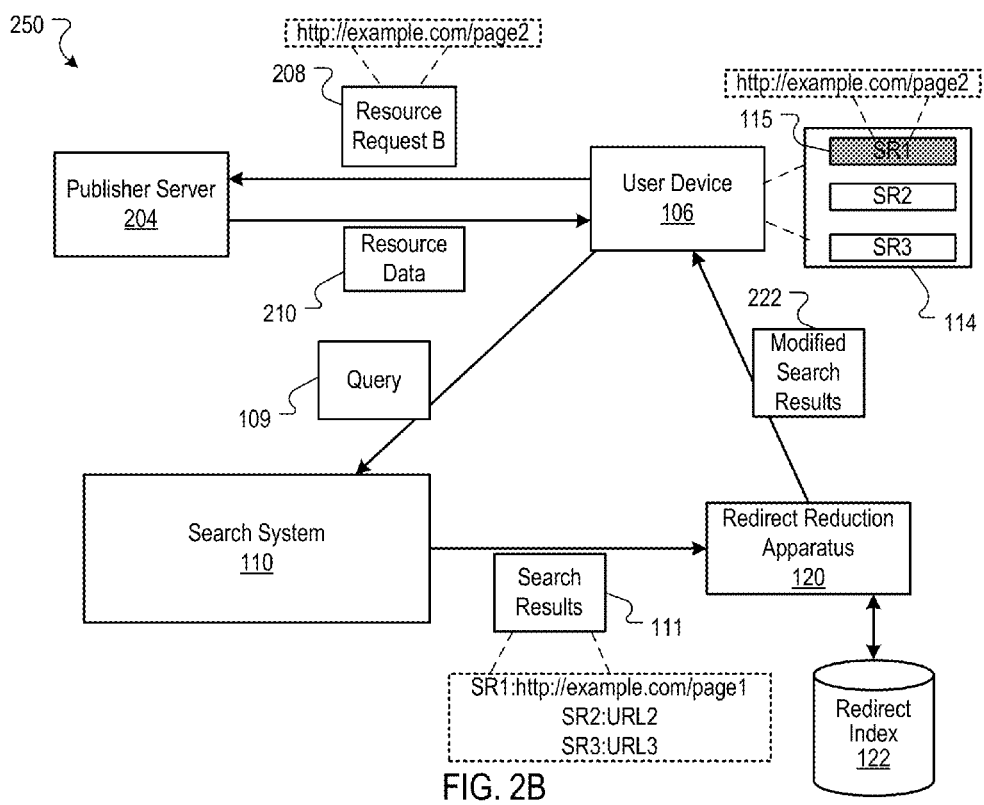
FIG. 2B is a block diagram of an example data flow for reducing redirects.

FIG. 2B is a block diagram of an example data flow 250 for reducing redirects. The data flow 250 begins with a user device 106 submitting a query 109 to a search system 110. The query can also be provided to the redirect reduction apparatus 120 either by the user device 106 or by the search system 110. As described above with reference to FIG. 1, the search system 110 identifies resources that are responsive to the search query 110 ("responsive resources") and generates search results 111 that reference (e.g., link to) the responsive resources. Each search result can include, for example, a hypertext link that upon user interaction with the search result causes the user device to initiate a request for the resource that is at the network location specified in the hypertext link. For example, search result SR1 in FIG. 2B can include a hypertext link that includes the URL http://example.com/page1, such that user interaction with search result SR1 will cause the user device 106 to request the resource from example.com/page1.

The search system 110 provides data specifying one or more of the search results 111 to the redirect reduction apparatus 120. The redirect reduction apparatus 120 can compare the resources that are referenced by (e.g., linked to) the search results 111 to the list of redirect resources that are listed in the redirect index 122 to determine if any resource referenced by the search results is a redirect resource. For example, the redirect reduction apparatus 120 can compare the network location in the hypertext link of each search result (e.g., http://example.com/page1) to network locations of the redirect resources listed in the redirect index 122. If one of the search results 111 is determined reference a redirect resource, the hypertext link for that search result can be replaced with a hypertext link to the standard resource to which the redirect resource redirects user devices. Thus, user interaction with that search result will cause the user device to request the standard resource without first requesting the redirect resource.

For example, assume that SR1 includes a hypertext link to example.com/page1, and that the redirect reduction apparatus 120 determines that the resource that is located at example.com/page1 is listed as a redirect resource in the redirect index 122. Further assume that according to the redirect index 122 the redirect resource at example.com/page1 redirects user devices to a standard resource that is located at example.com/page2. In this example, the redirect reduction apparatus 120 can insert a hypertext link to example.com/page2 into SR1 and/or remove or disable the hypertext link to example.com/page1 that was initially included in SR1, thereby creating a set of modified search results 222. In turn, the redirect reduction apparatus 120 can provide the set of modified search results 222 to the user device for presentation in a search results page 114.

When a user interacts with the modified version of SR1 115, the hypertext link to example.com/page2 will cause the user device 106 to submit Resource Request B 208 to the publisher server 204, and the publisher server 204 will respond to the user device 106 with resource data 210 that cause presentation of the resource that is located at example.com/page2. Thus, in this example, user interaction with SR1 115 will cause the user device 106 to request the resource from example.com/page2 without first requesting the redirect resource that is located at example.com/page1, thereby reducing the number of redirects that the user device will make before presentation of the resource that is located at example.com/page2.

In some implementations, the visual appearance of a search result for a redirect resource is not changed when the search result becomes a modified search that links to a standard resource. For example, after modification SR1 115 may still visually indicate that SR1 is a search result for a resource that is located at example.com/page1, even though user interaction with the search result will initiate a request for the resource at example.com/page2. In some implementations, a modified search result is visually altered such that the network location from which the standard resource will be requested in response to user interaction with the modified search result matches the network location that is visually referenced by the modified search result.

Figure 3:
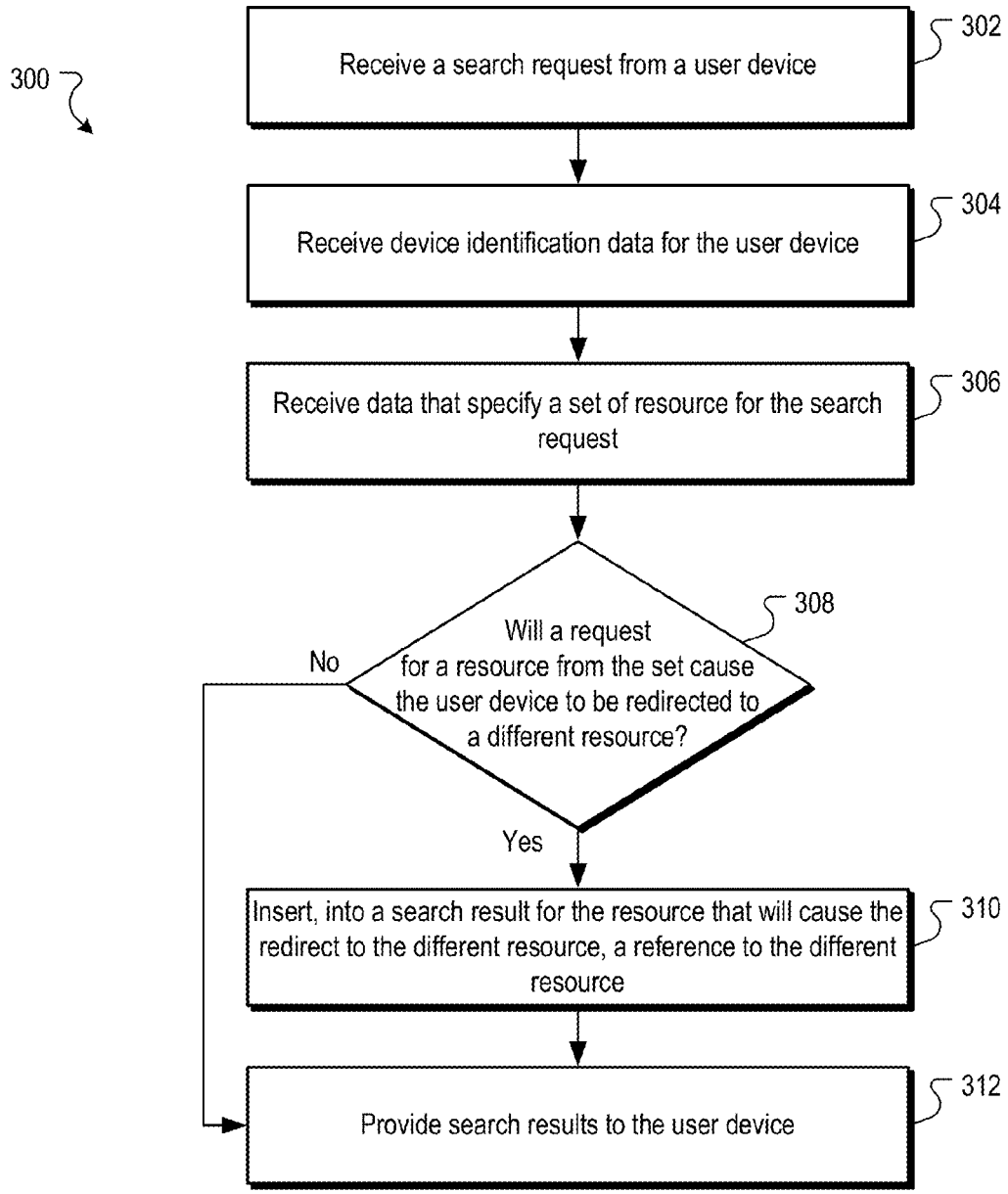
FIG. 3 is a flow chart of an example process for reducing redirects.

FIG. 3 is a flow chart of an example process 300 for reducing redirects. The process 300 can be implemented, for example, by a data processing apparatus, such as the redirect reduction apparatus 120 of FIG. 1. The process 300 can also be implemented as instructions stored on computer storage medium such that execution of the instructions by a data processing apparatus cause the data processing apparatus to perform the operations of the process 300.

A search request is received from a user device (302). In some implementations, the search request includes a search query (e.g., text and/or images) with which search results will be selected. The search request can be received, for example, from a mobile device, such as a "smartphone" that has Internet connectivity, and be received over a cellular network or another wireless network. The search request can be received, for example, by a search system and/or another data processing apparatus, such as the redirect apparatus 120 of FIG. 1. Note that the redirect apparatus 120 can also receive data specifying that the search request was received and/or data from the search request without receiving the actual search request. For example, the search system 110 of FIG. 1, or another data processing apparatus may provide the data to the redirect apparatus 120.

Device identification data for the user device are received (304). Device identification data are data that specify a type of device from which the search request was initiated and/or submitted. For example, the device identification data can include a user-agent header that specifies a manufacturer (or brand) of the user device and/or a model of the user device. The user-agent header may include, for example, data specifying that a particular search request was submitted by a user device manufactured by Brand-X Phone Co, and that the model number is BXP-100.

The device identification data may also include version data specifying a hardware and/or software configuration of the user device. For example, the user-agent header may include data specifying a firmware version that is currently installed on the user device and/or information about the browser from which the search request was initiated. Additionally, the user-agent header may indicate a type of browser from which the search request was submitted.

The device identification data can be used to determine whether the user device from which the search request was initiated is a mobile device, such as a smartphone, or whether the user device is a laptop or desktop device. In some implementations, the brand and model information may be cross-referenced with a list of brands and models of mobile devices. For example, assume that model BXP-100 from Brand-X Phone Co. is included on a list of smartphones. In this example, search requests that are received from user devices having device identification data specifying a manufacturer of Brand-X and a model BXP-100 can be considered to have been received from a mobile user device.

In some implementations, a type of user device that submitted the search request can be based on the type of browser that was used to submit the search request. For example, mobile devices may use mobile versions of browsers (e.g., rather than/or in addition to desktop versions of the browsers). Therefore, search requests that are received from user devices having agent-user headers that specify a mobile version of a browser can be considered to have been received from a mobile device, such as a smartphone or a non-mobile device, such as a desktop computer.

Data that specify a set of responsive resources for the search request are received (306). In some implementations, the data that specify a set of responsive resources are data that specify a set of search results for the resources. The data that specify a set of search results can be received, for example, from a search system that has generated the search results in response to the search request. The data can specify, for each search result, any of the information that is specified by the search result including, for example, the resource that is referenced by the search result and/or the network location of the resource.

A determination is made whether a request for one or more of the responsive resources will cause the user device to be redirected to a different resource (308). In some implementations, the determination can be made based on redirect data that have been indexed and/or stored with reference to resources from the set of resources. For example, as described above, a network location for a particular responsive resource can be compared to network locations for a set of known redirect resources that are specified by redirect data. If the network location (e.g., a URL) for the particular responsive resource does not match a network location (e.g., a URL) for one of the redirect resources, the particular responsive resource can be considered to not be a redirect resource (i.e., be a standard resource). Thus, a request for the particular responsive resource can be determined to not cause the user device to be redirected to a different resource than that located at the network location for the particular responsive resource. If each of the responsive resources in the set is determined to not be a redirect resource, search results for the set of responsive resources are provided to the user device (312).

If the network location (e.g., a URL) for a particular responsive resource matches a network location (e.g., a URL) for one of the redirect resources (or is otherwise identified as being a redirect resource), the particular responsive resource can be considered to be a redirect resource (i.e., that will redirect the user device to a different resource). Thus, a request for the particular responsive resource can be determined to cause the user device to be redirected to a different resource other than the particular responsive resource.

If the particular resource is determined to be a redirect resource based on a match between the network location of the particular responsive resource and a redirect resource, a reference to the different resource can be inserted into a search result for the particular resource (310), as described in more detail below. However, further determinations may be made prior to inserting the reference to the different resource.

As described above, the determination that a particular responsive resource is a redirect resource can be conditioned on factors in addition to the particular responsive resource having a URL that matches a URL specified in the redirect data. For example, redirects by a particular responsive resource may be conditioned on a type of device (e.g., mobile device) that is requesting the resource, a manufacturer of the device, whether the user device is storing a particular cookie (or other data file), such as a cookie that was placed on the user device by the entity that provides both the search system and the particular responsive resource, and/or language setting data that are received from the user device. Therefore, the determination of whether a request for a particular responsive resource will cause the user device to be redirected to a different resource may be based, at least in part, on whether characteristics of the user device match the conditions for redirect, which are referred to as redirect conditions.

As described above, the redirect conditions for a particular redirect resource can be stored, for example, in the redirect data for the particular redirect resource. For example, the redirect data for the particular responsive resource can specify whether the particular responsive resource redirects all user devices, only mobile devices, only non-mobile user devices, or some combination of mobile and/or non-mobile user devices (e.g., based on language setting data, manufacturer, or cookie status—i.e., whether the user device is storing a particular cookie).

In some implementations, when the user device is determined to be a mobile user device (e.g., based on the device identification data), a determination can be made whether the particular responsive resource redirects mobile devices to the different resource. The determination can be made, for example, based on whether redirect data for the particular responsive resource indicate that the particular responsive resource redirects mobile devices to a different resource. If mobile devices are determined to be redirected to the different resource (assuming that any other redirect conditions are satisfied), the reference to the different resource can be inserted into the search result for the particular responsive resource (312) independent of whether the particular responsive resource redirects non-mobile devices. If mobile devices are determine to not be redirected to a different resource by the particular responsive resource, the search result for the particular responsive resource can be provided without inserting the reference to the different resource.

When the user device is determined to be a non-mobile user device (i.e., a user device that has not been identified as a mobile device), a determination can similarly be made whether the particular responsive resource redirects non-mobile user devices to the different resource. The determination can be made, for example, based on whether redirect data for the particular responsive resource indicate that the particular responsive resource redirects non-mobile devices to a different resource.

If non-mobile devices are determined to be redirected to the different resource (assuming that any other redirect conditions are satisfied), the reference to the different resource can be inserted into the search result for the particular responsive resource (312) independent of whether the particular responsive resource redirects mobile devices. If non-mobile devices are determined to not be redirected to a different resource by the particular responsive resource, the search result for the particular responsive resource can be provided to the non-mobile device without inserting the reference to the different resource. Thus, a search result for the particular responsive resource that is provided to a non-mobile device may not have a reference to the different resource to which mobile devices are redirected, even if the reference to the different resource has been inserted into another search result for the particular responsive resource that is provided to a mobile device. Accordingly, the link that is included in different search results for the same resource can vary based on the type of device to which the search result is being provided.

Similar techniques can be used to determine whether a cookie-based redirect condition is satisfied for a particular responsive resource. For example, a determination can be made whether the user device is storing a cookie for the particular responsive resource that is referenced by a search result. As noted above, the cookie for the particular responsive resource can be detected by a search system when the entity that provides the search system is the same entity that provides the particular responsive resource. For example, if an entity that provides an online search system and an online video sharing site places a cookie on the user device, that entity can detect the cookie when a search request is received from the user device.

If the user device is storing a cookie for the particular responsive resource, the redirect data for the particular responsive resource can be inspected to determine whether the particular responsive resource redirects user devices that are storing the cookie (assuming that any other redirect conditions are also satisfied). If the particular responsive resource is determined to not redirect user devices based on the cookie being stored on the user device, the search result for the particular responsive resource can be provided without inserting a reference to a different resource. However, if the particular responsive resource is determined to redirect user devices that are storing the cookie to a different resource, a reference to the different resource is inserted into the search result for the particular responsive resource.

In this example, the search results for the particular responsive resource that are provided to user devices storing the cookie will include a link to the different resource, while other search results for the same particular responsive resource that are provided to user devices not storing the cookie will not include the link to the different resource. Accordingly, user interaction with the search results for the particular responsive resource that are provided to the user devices storing the cookie will cause the user devices to request a different resource than the resources that are requested through user interaction with search results for the same particular responsive resource that are provided to user devices that are not storing the cookie.

In some implementations, a determination whether a redirect by the particular responsive resource is conditioned on receiving particular language setting data from the user device. For example, a user device that provides language setting data of "en" may be redirected to a web page that was published in English, while a user device that provides language setting data of "fr" may be redirected to a web page that was published in French. Thus, the redirect of a particular user device may be conditioned on the language setting data that are provided by the user device with a request for the resource and/or the search request.

Search results are provided to the user device (312). If at least one of the responsive resources were identified as redirect resources for the user device that submitted the search request, the search results can include at least one modified search result in which a reference (e.g., a hypertext link) to a different resource (i.e., different than the redirect resource) has been inserted, such that user interaction with a modified search result will initiate a request for the different resource without first requesting the redirect resource. If none of the responsive resources were identified as redirect resources, each of the search results can be provided to the user device without inserting a new reference to a different resource.

Figure 4:
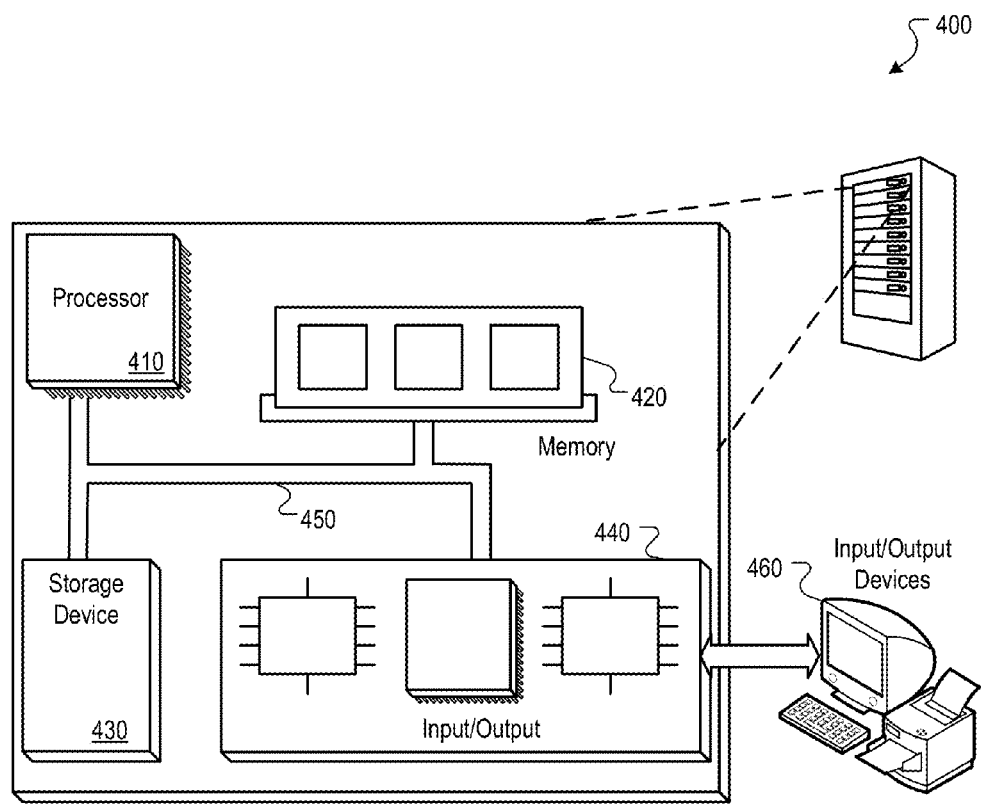
FIG. 4 is block diagram of an example computer system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving data that specify a set of responsive resources for a search request that was submitted by a user device, and identification data indicating that the user device is a user device of a first type;
   determining, by a data processing apparatus and prior to providing search results in response to the search request, that a particular resource from the set of responsive resources redirects the user device of the first type to a different resource that is formatted for presentation on the user device of the first type and is different than the particular resource that was identified as responsive to the search request, wherein the particular resource does not redirect a user device of a second type that is different from user devices of the first type to the different resource;
   in response to the determination and prior to providing the search results in response to the search request, removing, by a data processing apparatus and from a search result for the particular resource, a link that initiates a request for the particular resource and replacing, in the search result, the removed link with a different link that initiates a request for the different resource in response to user interaction with the search result for the particular resource such that the search result for the particular resource includes the different link to the different resource and does not include the link to the particular resource; and providing, to the user device of the first type, a set of search results responsive to the search request, the set of search results including the search result for the particular resource that includes the different link that initiates the request for the different resource and that does not include the removed link.

2. The method of claim 1, wherein determining that a particular resource redirects the user device of the first type to the different resource comprises:

determining that the user device of the first type is a mobile device; and determining that a resource request for the particular resource from a mobile device will cause the mobile device to be redirected.

3. The method of claim 2, wherein determining that the particular resource will cause a mobile device to be redirected comprises:

receiving redirect data specifying one or more resources that have been identified as a redirect resource, a redirect resource being a resource that will cause at least one user device to request a different resource in response to a resource request for the redirect resource;

determining that an identifier for the particular resource is included in the redirect data; and determining that the redirect data for the particular resource indicate that the particular resource causes mobile devices to be redirected to the different resource in response to a request for the particular resource from the mobile devices.

4. The method of claim 3, further comprising determining that the redirect data for the particular resource indicate that the particular resource does not cause non-mobile devices to be redirected to the different resource in response to a resource request for the particular resource from the non-mobile devices.

5. The method of claim 4, further comprising:

receiving data that specify a search result for the particular resource, the search result including a link to the particular resource;

determining that the search result is being provided to a non-mobile device; and providing the search result to the non-mobile device, the search result including the link to the particular resource.

6. The method of claim 1, further comprising:

receiving, by the user device of the first type, the search result for the particular resource;

determining, by the user device of the first type, that a user interaction with the search result occurred; and requesting, by the user device of the first type, the different resource in response to the user interaction with the search result.

7. The method of claim 1, further comprising:

determining that the user device of the first type is storing a cookie for the particular resource, wherein determining that a particular resource will cause the user device of the first type to be redirected to a different resource comprises determining that the different resource is selected based, at least in part, on information from the cookie.

8. The method of claim 1, further comprising:

determining that language setting data received from the user device of the first type specifies a particular language for the user device of the first type, wherein determining that a particular resource will cause the user device of the first type to be redirected to a different resource comprises determining that the different resource is selected based, at least in part, on receiving, from the user device of the first type, the language setting data representing the particular language.

9. The method of claim 1, further comprising:

determining, by a data processing apparatus, that the set of responsive resources includes a brand-based redirect resource, the brand-based redirect resource being a resource that causes a particular brand of user device to be redirected to a brand-specific resource that is different than the brand-based redirect resource;

determining that brand-based redirect data for the brand-based redirect resource is not available for at least one brand of user device; and providing a search result for the brand-based redirect resource to the user device of the first type, the search result for the brand-based redirect resource including a reference to the brand-based redirect resource.

10. The method of claim 1, further comprising:

determining, by a data processing apparatus, that the set of responsive resources includes a language-based redirect resource, the language-based redirect resource being a resource that causes a user device having particular language setting data to be redirected to a language-specific resource that is different than the language-based redirect resource;

determining that language-based redirect data for the language-based redirect resource is not available for at least one language setting; and providing a search result for the language-based redirect resource to the user device having particular language setting data, the search result for the language-based redirect resource including a reference to the language-based redirect resource.

11. The method of claim 1, further comprising:

determining, by a data processing apparatus, that the set of responsive resources includes a transient redirect resource, the transient redirect resource being a resource that causes the user device of the first type to be redirected to a transient resource that is different than the transient redirect resource; and providing a search result for the transient redirect resource to the user device of the first type, the search result for the transient redirect resource not including a reference to the transient resource.

12. A non-transitory computer storage medium encoded with a computer program, the program comprising instructions that when executed by data processing apparatus cause the data processing apparatus to perform operations comprising:

receiving data that specify a set of responsive resources for a search request that was submitted by a user device, and identification data indicating that the user device is a user device of a first type;

determining, prior to providing search results in response to the search request, that a particular resource from the set of responsive resources redirects the user device of the first type to a different resource that is formatted for presentation on the user device of the first type and is different than the particular resource that was identified as responsive to the search request, wherein the particular resource does not redirect a user device of a second type that is different from user devices of the first type to the different resource;

in response to the determination and prior to providing the search results in response to the search request, removing from a search result for the particular resource, a link that initiates a request for the particular resource and replacing, in the search result, the removed link with a different link that initiates a request for the different resource in response to user interaction with the search result for the particular resource such that the search result for the particular resource includes the different link to the different resource and does not include the link to the particular resource; and providing, to the user device of the first type, a set of search results responsive to the search request, the set of search results including the search result for the particular resource that includes the different link that initiates the request for the different resource and that does not include the removed link.

13. A system comprising:

a user device; and one or more computers operable to interact with the user device and to perform operations comprising:

receiving data that specify a set of responsive resources for a search request that was submitted by a user device, and identification data indicating that the user device is a user device of a first type;

determining, prior to providing search results in response to the search request, that a particular resource from the set of responsive resources redirects the user device of the first type to a different resource that is formatted for presentation on the user device of the first type and is different than the particular resource that was identified as responsive to the search request, wherein the particular resource does not redirect a user device of a second type that is different from user devices of the first type to the different resource;

in response to the determination and prior to providing the search results in response to the search request, removing from a search result for the particular resource, a link that initiates a request for the particular resource and replacing, in the search result, the removed link with a different link that initiates a request for the different resource in response to user interaction with the search result for the particular resource such that the search result for the particular resource includes the different link to the different resource and does not include the link to the particular resource; and providing, to the user device of the first type, a set of search results responsive to the search request, the set of search results including the search result for the particular resource that includes the different link that initiates the request for the different resource and that does not include.

14. The system of claim 13, wherein determining that a particular resource redirects the user device of the first type to the different resource comprises:

determining that the user device of the first type is a mobile device; and determining that a resource request for the particular resource from a mobile device will cause the mobile device to be redirected.

15. The system of claim 14, wherein determining that the particular resource will cause a mobile device to be redirected comprises:

receiving redirect data specifying one or more resources that have been identified as a redirect resource, a redirect resource being a resource that will cause at least one user device to request a different resource in response to a resource request for the redirect resource;

determining that an identifier for the particular resource is included in the redirect data; and determining that the redirect data for the particular resource indicate that the particular resource causes mobile devices to be redirected to the different resource in response to a request for the particular resource from the mobile devices.

16. The system of claim 15, wherein the one or more computers are further operable to perform operations comprising determining that the redirect data for the particular resource indicate that the particular resource does not cause non-mobile devices to be redirected to the different resource in response to a resource request for the particular resource from the non-mobile devices.

17. The system of claim 16, wherein the one or more computers are further operable to perform operations comprising:

receiving data that specify a search result for the particular resource, the search result including a link to the particular resource;

determining that the search result is being provided to a non-mobile device; and providing the search result to the non-mobile device, the search result including the link to the particular resource.

18. The system of claim 13, wherein the user device of the first type is further operable to perform operations comprising:

receiving the search result for the particular resource;

determining that a user interaction with the search result occurred; and requesting the different resource in response to the user interaction with the search result.

19. The system of claim 13, wherein the one or more computers are further operable to perform operations comprising:

determining that the user device of the first type is storing a cookie for the particular resource, wherein determining that a particular resource will cause the user device of the first type to be redirected to a different resource comprises determining that the different resource is selected based, at least in part, on information from the cookie.

20. The system of claim 13, wherein the one or more computers are further operable to perform operations comprising:

determining that language setting data received from the user device of the first type specifies a particular language for the user device of the first type, wherein determining that a particular resource will cause the user device of the first type to be redirected to a different resource comprises determining that the different resource is selected based, at least in part, on receiving, from the user device of the first type, the language setting data representing the particular language.

21. The system of claim 13, wherein the one or more computers are further operable to perform operations comprising:

determining that the set of responsive resources includes a brand-based redirect resource, the brand-based redirect resource being a resource that causes a particular brand of user device to be redirected to a brand-specific resource that is different than the brand-based redirect resource;

determining that brand-based redirect data for the brand-based redirect resource is not available for at least one brand of user device; and providing a search result for the brand-based redirect resource to the user device of the first type, the search result for the brand-based redirect resource including a reference to the brand-based redirect resource.

22. The system of claim 13, wherein the one or more computers are further operable to perform operations comprising:

determining that the set of responsive resources includes a language-based redirect resource, the language-based redirect resource being a resource that causes a user device having particular language setting data to be redirected to a language-specific resource that is different than the language-based redirect resource;

determining that language-based redirect data for the language-based redirect resource is not available for at least one language setting; and providing a search result for the language-based redirect resource to the user device having particular language setting data, the search result for the language-based redirect resource including a reference to the language-based redirect resource.

23. The system of claim 13, wherein the one or more computers are further operable to perform operations comprising:

determining that the set of responsive resources includes a transient redirect resource, the transient redirect resource being a resource that causes a user device to be redirected to a transient resource that is different than the transient redirect resource; and providing a search result for the transient redirect resource to the user device of the first type, the search result for the transient redirect resource not including a reference to the transient resource.

* * * * *